Aug. 10, 1948.    F. H. JOHNSON    2,446,932
WELDING APPARATUS
Filed March 27, 1943    2 Sheets-Sheet 1
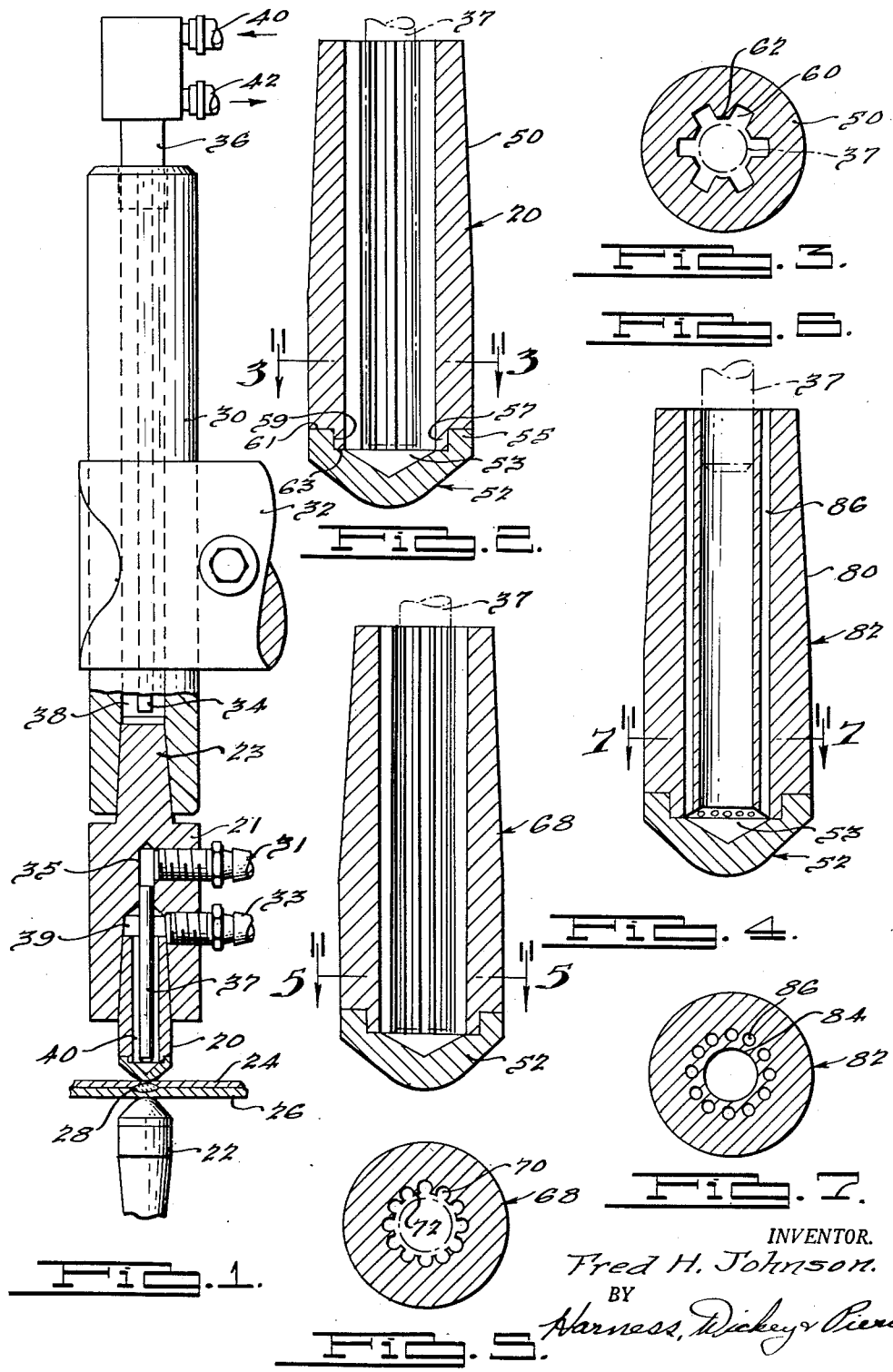
INVENTOR.
Fred H. Johnson.
BY
Harness, Dickey & Pierce

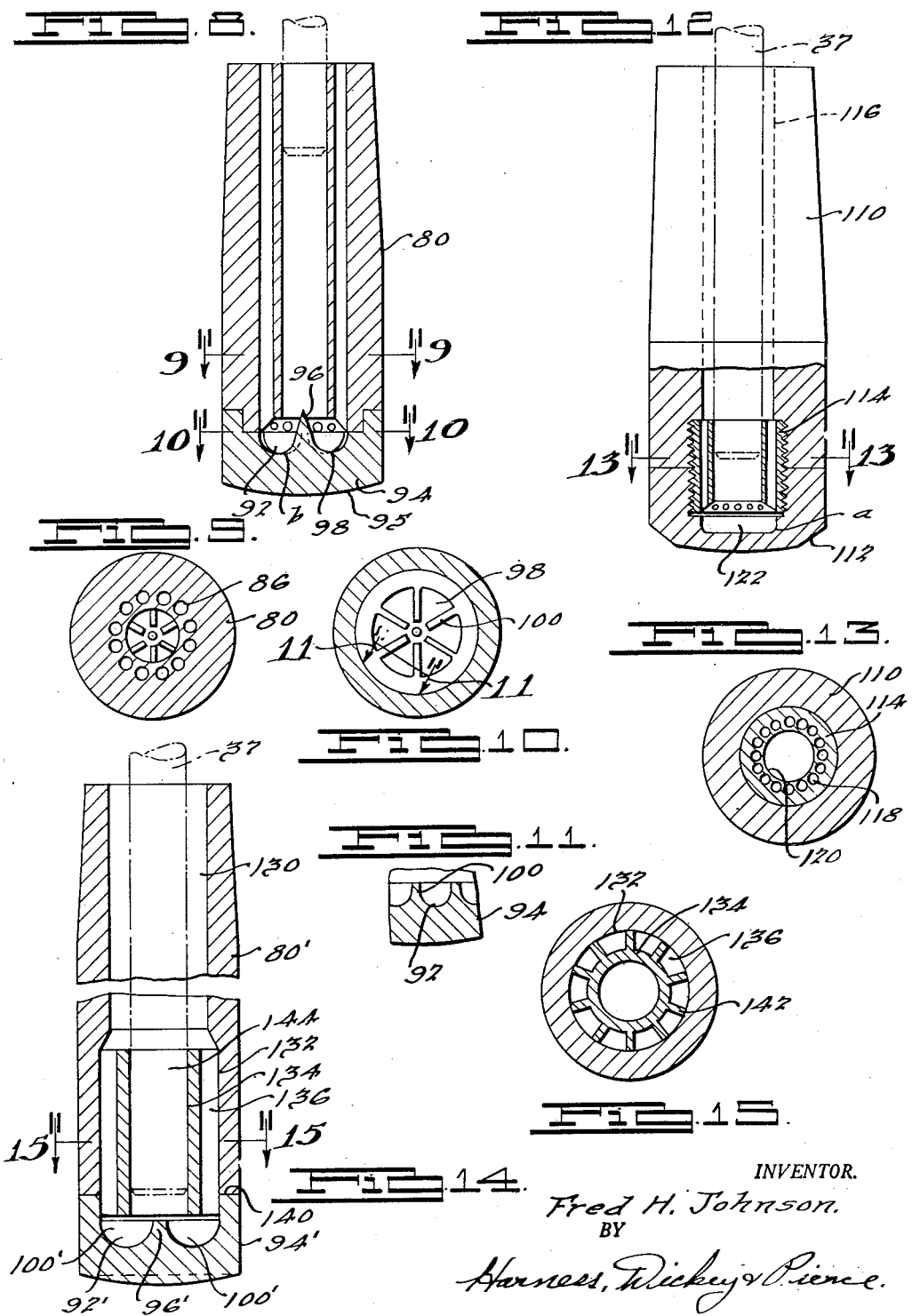

UNITED STATES PATENT OFFICE 2,446,932

WELDING APPARATUS

Fred H. Johnson, Pleasant Ridge, Mich.

Application March 27, 1943, Serial No. 480,742

14 Claims. (Cl. 219—4)

The present invention relates to the structure of and arrangement for effecting the cooling of devices subjected to heating effects, and in the herein disclosed embodiments, provides improved electrodes suitable for use in resistance welding operations. The present application is a continuation-in-part of my prior copending application Serial No. 467,827, filed December 4, 1942, now abandoned.

As will be understood in conventional resistance welding operations, the work to be welded is engaged between a pair of opposed electrodes and the welding current is caused to flow through these electrodes and through the work, so as to cause the engaging work surfaces to be heated sufficiently to cause the formation of the weld nugget. In these operations, it has become conventional to provide for artificially cooling the electrodes by providing inflow and outflow passages through the electrode body, through which a suitable coolant can be circulated. More particularly, it has been the practice to provide the electrode with a longitudinally extending bore which extends to within a predetermined distance of the work engaging face of the electrode and to provide the electrode holder with a so-called deflector tube which, when the electrode is fitted to the holder, projects into the just-mentioned bore to a point within a predetermined distance of the end of the bore. The practice has been to introduce the coolant through the deflector tube and allow it to be discharged from the electrode through the annular bore space which surrounds the tube.

The above practice has led to considerable difficulty, due largely to the fact that in applying different size electrodes to the holder, the spacing between the end of the deflector tube and the end of the electrode cavity varies, thus altering the effectiveness of the coolant circuit. One object of the present invention is to so construct the electrode as to enable it to itself define its inflow and outflow passages, whereby variations of the above sort are avoided.

The increased duty to which resistance welding equipment is subjected under present conditions, together with problems, such as metal pickup and the like, which are encountered in the welding of certain of the relatively low resistance metals, such as aluminum, aluminum alloys and the like, has given rise to a decided need for improving the cooling arrangements for electrodes. It is known to circulate a refrigerated coolant through the electrodes, whereby to materially increase the rate at which heat developed during the welding process can be extracted from the electrodes and to maintain the work engaging faces of the electrodes at temperatures which facilitate the welding operations. The improvements of the present invention materially increase the effectiveness of the refrigerated coolant, but are also beneficial to and increase the efficiency of cooling systems using unrefrigerated fluids, such as water. These improvements have to do with increasing the heat transfer area of the electrode, which increased area is distributed along the length of the electrode body and is also distributed immediately adjacent the work engaging face of the electrode, and the principal object of the present invention is, consequently, to provide an electrode having highly efficient heat transfer characteristics.

Conventionally, the aforesaid electrodes have been made in one piece and the aforesaid bore has been terminated a substantial distance from the work engaging face of the electrode, to allow for a series of point dressing operations. After such dressing operations have removed the tip metal to within a certain distance of the end of the bore, it has been the practice to scrap the entire electrode. This practice is objectionable, both from the standpoint of the relatively large mass of material which is thus scrapped and also because successive tip dressing operations, by bringing the end of the coolant passage progressively nearer to the work engaging face, alter the effectiveness of the cooling circuit. It has heretofore been proposed to overcome this difficulty by providing the electrode body with a replaceable tip. It has further been proposed to form the tip of a hardened material. So far as the present applicant is aware, however, such proposals have not met commercial success for the reason that no satisfactory method has been found for making the connection between the tip and the electrode body. A principal feature of the present invention resides in forming the tip of a hardened material (produced, for example, by coining or forging a hard drawn copper slug) and in bonding the tip to the body by a fusible material having a fusion point lower than the annealing temperature of the tip. An ordinary solder has been found suitable as the bonding material. A principal object of the invention is, consequently, to produce an electrode structure of the just-mentioned type.

Other and, in certain other cases, more detailed objects of the invention are to provide improved constructions of heating elements, particularly electrodes, which can be economically manufactured and which are materially more efficient in operation; to provide such constructions with improved cooling arrangements characterized in one sense as affording materially larger heat transfer surfaces without requiring an increase in the over-all size of the element or electrode; to provide such structures wherein the electrode proper is formed of two parts, preferably a body and a tip, whereby to enable the tip to be replaced without requiring the replacement of the body; to provide such constructions wherein the tip is formed by a cold heading process, whereby to harden and close the grain structure thereof and afford better wearing qualities, the body, on the other hand, being formed by less expensive methods; to provide such constructions wherein the joint between the body and the tip is completed by a fusible material which fuses at a temperature below the annealing temperature of the tip; to provide such structures wherein the tip is provided with at least a portion of the cooling surface which is directly engaged by the coolant; to provide such constructions wherein the electrode itself defines both inflow and outflow passages for the coolant, whereby variations in the extent to which the usual deflector tube is projected into the electrode do not cause variations in the cooling effect of the coolant; and to generally improve the construction and arrangement of electrodes suitable for resistance welding operations.

With the above as well as other objects in view, which appear in the following description and in the appended claims, preferred but illustrative embodiments of the invention are shown in the accompanying drawings, throughout the several views of which corresponding reference characters are used to designate corresponding parts and in which:

Figure 1 is a view in elevation, partly in section, of the electrode structure for a resistance welding machine embodying the invention;

Figure 2 is an enlarged view in longitudinal central section of one of the electrodes shown in Fig. 1;

Figure 3 is a view in horizontal section, taken along the line 3—3 of Fig. 2;

Figure 4 is a view in longitudinal central section of a modification of the invention;

Figure 5 is a view in section, taken along the line 5—5 of Fig. 4;

Figure 6 is a view in longitudinal central section of a further modification of the invention;

Figure 7 is a view in horizontal section, taken along the line 7—7 of Fig. 6;

Figure 8 is a view in longitudinal central section of a further modification of the invention;

Figures 9 and 10 are views in horizontal section, taken, respectively, along the lines 9—9 and 10—10 of Fig. 8;

Figure 11 is a fragmentary view in section, taken along the line 11—11 of Fig. 10;

Figure 12 is a view in elevation, partly in longitudinal central section, of a further modification of the invention;

Figure 13 is a view in horizontal section, taken along the line 13—13 of Fig. 12;

Figure 14 is a view, partly in longitudinal central section, of a further modification of the invention; and Figure 15 is a view in horizontal section taken along the line 15—15 of Fig. 14.

Referring first to Fig. 1, the assembly will be recognized as comprising generally a pair of electrodes 20 and 22, which may be and preferably are of similar construction, between which the illustrative workpieces 24 and 26 may be clamped in order to effect a welding operation and form the weld nugget 28. The electrode 20 is shown as being of tapered form and as being tightly received in the correspondingly tapered bore of an adapter 21. The tapered neck 23 of the adapter 21 is tightly fitted into the correspondingly tapered bore of a usual holder 30. The holder 30, in turn, is supported by a usual horn 32. It will be understood that the lower electrode 22 may be similarly supported and that the welding circuit may, in accordance with conventional practice, extend from the horn 32 through the holder 30, the electrode 20, the work 24—26, the lower electrode 22 and thence through the associated holder and horn (not shown) to the other side of the source of supply.

In the broader aspects of the invention, the holder 30, adapter 21 and electrode 20 may be provided with a common coolant circuit. In the preferred practice of the invention, however, the adapter 21 and the electrode 20 are provided with one coolant circuit through which a refrigerated medium is passed and the holder 30 is provided with a separate circuit through which an unrefrigerated medium is passed. The use of refrigerated mediums maintains the surfaces of the associated parts in a frosted condition and it is preferred to limit this frosted condition to those parts of the structure which need the action of the refrigerated coolant. By providing the separate coolant circuits, the holder may be cooled by an unrefrigerated medium, such as water, thereby keeping the horn, the holder and other parts of the apparatus in a satisfactory dry condition. As shown, the bore of the holder 30 receives a deflector tube 34, which is connected at its upper end to a fitting 36, which, in turn, is secured to the holder. The fitting 36 is provided with separate inflow and outflow passages which communicate, respectively, with the deflector tube 34 and the annular bore space 38, and is also provided with inflow and outflow coolant connections 40 and 42, which communicate with the just-mentioned passages. As will be further understood, the cooling medium for the holder may be introduced through the fitting to the deflector tube 34, from whence it is discharged at the lower end into the annular bore space 38 and causes reverse flow through such annular bore space to the discharge passage of the fitting 36. As will further be understood, the coolant extracts heat from the holder by the heat transfer action which occurs between the coolant and the surface of the holder, over which this coolant flows.

The adapter 21 is provided with inflow and outflow passages and corresponding fittings 31 and 33. The passage 31 opens into a longitudinal bore 35, which, in the embodiment now being described, receives a deflector tube 37. Tube 37 extends through the body of the electrode 20 to a point near the work engaging face thereof. The outflow passage opens into the tapered bore 39 of the adapter, which, as aforesaid, tightly receives the electrode 20. The refrigerated coolant introduced through the fitting 31, thus flows through the passage 35 and tube 37 into the annular bore space 40, which surrounds the tube 37, from whence it is discharged through the space 39 and fitting 33.

Referring now to Figs. 2 and 3, the electrode 20 comprises a body 50 and a tip 52. The outer form of the body 50 is such as to accommodate it to the adapter 21, and in this case is of the previously mentioned tapered form. The face of the tip 52 is given a form suited to the particular work being welded, and as shown is dome-shaped.

In the broader aspects of the invention, the body 50 and the tip 52 may be formed of any of a variety of materials, such as copper and the various alloys of copper, which have heretofore been found suitable for electrode purposes. In the preferred practice, both the body and the tip are formed of so-called hard-drawn copper. Also, in accordance with usual practice, the body 50 may be formed from bar or tubular stock by usual methods. Preferably but, in certain aspects of the invention, not necessarily, the tip 52 is formed by a cold heading or similar forging or drawing operation from a cylindrical slug of stock. As will be understood, such operation may serve to draw the work engaging face of the tip into the illustrated dome-like form to define the coolant pocket 53 therein, and to also define the annular flange 55, which, as shown, is fitted over the annular flange 57 at the end of the body.

The aforesaid forming operation, which can be readily practiced with hard-drawn copper slugs, closes the grain of the tip and toughens or hardens it, as will be understood, thereby materially increasing its resistance to wear. This increased resistance to wear makes it possible to bring the end of the coolant circuit considerably nearer to the actual work engaging face of the tip than is practical with electrodes formed by usual methods. This latter advantage very materially increases the effectiveness of the coolant, since the metal section through which the heat is required to be transferred from the work engaging face to the coolant is much reduced.

The majority of the alloys of copper conventionally used in making electrodes are too hard to admit of successful cold forming operations, as above described. In utilizing such alloys, accordingly, it is preferred to first anneal them, thereafter effect the aforesaid forming operation, and thereafter reharden them. The substantially increased conductivity of the hard-drawn copper, however, makes it preferable to such alloys, it being noted that the increased conductivity produces less heating by the welding current, thereby facilitating the maintenance of the tip, while in service, at temperatures below the annealing temperature thereof.

In so far as certain of the broader aspects of the invention are concerned, the tip 52 may be secured to the body 50 in any of a variety of known manners. Particularly in connection with the use of hardened tips, however, an important feature of the invention resides in bonding the tip to the body by means of a fusible material, such, for example, as ordinary solder, which has a fusion point below the temperature range at which annealing or softening of the tip occurs. Accordingly, in the preferred practice of the invention, a layer of ordinary solder is deposited on the surfaces 59, 61 and 63 of the body 50, or on the corresponding abutted surfaces of the tip 52, or on both said sets of surfaces. Thereafter the tip is fitted to the body, as shown, and the assembly is heated sufficiently to fuse the solder, thereby forming a liquid tight bond of considerable strength between the two elements. It is important that a portion of this bond be established along the abutting surfaces which are parallel to the axis of the electrode. This is for the reason that the substantial electrode pressures encountered in service do not tend to squeeze the material from between these abutting surfaces.

The heating may be accomplished in various ways, for example, by applying a pair of heating clamps to the electrode in the region of the joint between the body and the tip, and passing a heating current through the clamps. Sufficient current may be passed through the clamps to very rapidly bring the solder to the fusion point, without elevating the tip to a temperature at which detrimental annealing or softening action takes place.

It will be appreciated that the removal of the tip 52 may be effected in a similar manner, simply by reheating the assembly sufficiently to fuse the solder, after which the tip may be readily withdrawn from the body.

The use of the bonding material enables the tip and body to be dimensioned to have a relatively snug but free slip fit, so that the end of the body (of relatively softer and inexpensive material, is not damaged by frequent tip replacements.

In further accordance with the invention, the conventionally circular annular bore in the body 50 is replaced by a bore which, for a given diameter of electrode, has a materially greater heat transfer surface per unit of length. Specifically, this is accomplished with the structure of Figs. 2 and 3 by providing the axially extending, radially disposed passages 60, the maximum diameter whereof may be approximately the same as, or greater than, the diameter of a usual electrode bore. Such a construction affords in excess of twice the cooling area per unit of length.

In further accordance with the present arrangement, the minimum diameter defined by the surfaces 62, between adjacent grooves 60, is proportioned to be approximately equal to the outside diameter of the deflector tube 37, just sufficient clearance being allowed to accommodate slight misalignments which frequently occur between the axis of the deflector tube and the axis of the adapter 21. With this arrangement, the deflector tube and the electrode 20 cooperate to define a plurality of substantially independent discharge passages 60, which communicate with each other through the pocket 53 provided in the body engaging end of the tip 52.

In order to cause all of the coolant which is introduced through the tube 34 to impinge upon the surface of the pocket 64, it is preferred to carry the end of the deflector tube 34 down to a point in substantially flush relation to the end of the body 50.

In the modified construction shown in Figs. 4 and 5, the electrode 68 is constructed as described above with reference to Figs. 2 and 3, with the exception that the slot-like passages 60 are replaced by circular passages 70 which, as will be understood, define between them fin-like portions 72, having comparatively large cooling areas. In practice, it has been found that the construction of Figs. 4 and 5 affords substantially more cooling area per unit of length than does the construction of Figs. 2 and 3.

The further modified structure of Figs. 6 and 7 may be characterized in that the outflow passages are entirely independent of each other and communicate with each other only through the pocket 53 formed in the tip 52. More specifically, the body 80 of the electrode 82 is provided with a central bore 84, the diameter whereof is only slightly greater than the diameter of the associated deflector tube 37, the excess being just sufficient to accommodate the previously mentioned misalignments. The lower end of the bore 84 opens into the pocket 53. In addition, the body 80 is provided with a series of circumferentially distributed, preferably uniformly spaced, circular passages 86. The upper ends of the passages 86 open into the previously mentioned annular bore space 39 in the adapter 21 (Fig. 1) and the lower ends thereof open into the pocket 53 in the tip. It has been found in practice that for a given diameter of electrode, the effective cooling area can be approximately quadrupled, as compared to conventional constructions.

A further and important advantage of the construction of Figs. 6 and 7 is that the electrode 82 defines its own inlet passage and regardless of the distance to which the deflector tube 37 is projected into the bore 84, the entire coolant flow is, nevertheless, caused to flow from the bore 84 into the pocket 53 and thence outward through the passages 86.

It will be appreciated that in general a better heat transfer between a moving liquid and a metallic surface is obtained by a more or less streamlined flow of liquid over the surface than is obtained by a more or less turbulent flow, and for this reason, it may be expected that in at least certain instances, the streamlined flow afforded by the tip construction of Figs. 8, 9 and 10 produces more efficient heat transfer than is afforded by the angular but less expensively produced configuration of the pockets 53 shown in Figs. 2, 4 and 6. It is to be noted, however, that the provision of the separable tip is of material importance in this connection in that it enables the attainment of any desired pocket form in the tip, independently of the form or arrangement of the passages in the electrode body.

Referring particularly to Figs. 8, 9 and 10, the body 80 is constructed in the same manner as is described above in connection with Figs. 6 and 7. The pocket 92 in the tip 94 is of generally cuplike form, having a tapered column 96 rising vertically from the base thereof and of sufficient length to project a slight distance into the body 80. It will be understood that the pointed column is located at approximately the axis of the electrode and serves to deflect the stream of coolant entering through the central bore 84 into a cone-like form, thus causing a streamlined flow along the curvilinear surfaces 98. The curved form of these surfaces causes the coolant to follow a smoothly or streamlinedly curved path in reversing its flow and entering the passages 86. It will be understood that the exact form of the surfaces 98 may be varied between various limits dependent upon various factors, for example, the rate of flow of the coolant. Also, the maximum width of the column 96 may be varied, it being generally preferred to decrease this maximum dimension as the diameter of the spot weld to be formed is decreased, so as to enable the points, such as b, which are nearest the work engaging face of the electrode, to be also located immediately adjacent the weld zone.

As illustrated in Figs. 8, 9, 10 and 11, also, the streamlining and channeling may be increased by introducing a plurality of partitions 100 within the pocket 92. Various numbers of such partitions may be employed, six being illustrated in the drawing, so that the space between adjacent partitions accommodates two of the passages 86.

In utilizing the partitions 100, it is preferred, as illustrated in Fig. 11, to have the floor 102 of the pocket 92 of curved form so that all changes in direction of the coolant are effected by means of curved, as distinguished from angled, surfaces.

The partitions 100 are of substantial advantage, further, in that they greatly increase the heat transfer area of the tip 94, and also afford some additional structural strength, enabling the bases of the pockets 92 to be brought considerably nearer the work engaging face 95 of the tip than would otherwise be practical.

It will be understood that the tip 94 may be formed, and secured to the body 80, of materials and by processes corresponding to those described with reference to the tips 52. It will also be understood that the streamlined pocket formation of Figs. 8, 9 and 10 may be used to advantage with the electrode body constructions described with reference to Figs. 2 through 5.

In the embodiment of Figs. 12 and 13, the electrode comprises a body 110 of the previously described tapered form, a tip 112, and a flow controlling insert 114. The bore 116 in the body 110 may be and preferably is sufficiently larger than the deflector tube 37 to provide sufficient annular space for the discharge of the coolant. The insert 114 is provided with a series of circumferentially distributed passages 118, which are disposed about the central passage 120 therein. The diameter defined by the outer boundary of the passages 118 may be and preferably is proportioned to be approximately equal to the diameter of the passage 116 in the body. As before, the passage 120 through the insert 114 is proportioned to rather snugly receive the end of the associated deflector tube 37, and it will be understood that variations in the degree to which the deflector tube projects into the insert 114 are immaterial, since the passage 120 itself defines the inlet passage to the tip 112. The lower end of the insert 114 opens into the pocket 122 formed in the tip 112. This pocket 122 is shown as being ellipsoidal, although other forms may be used, for example, those shown in the other embodiments. Coolant entering the pocket 122 is caused to flow along the rounded surface portions a into the passages 118.

The tip 112 may, as will be understood, be formed of materials and by processes corresponding to those described in connection with the tip 52, and may be similarly secured to the body 110. As shown, however, the insert 114 is threaded into a counterbore in the body 110, and the tip is threadably secured to the insert. It will be understood that in practice the tip may be turned onto the insert sufficiently far to bring the opposed end surfaces of the body and tip into solid sealing engagement with each other, which threaded relationship is now regarded as being of particular use in connection with the larger sizes of electrodes.

The remaining embodiment, shown in Figs. 14 and 15, corresponds to the embodiment of Figs. 8 and 9, with the following exceptions. In this case, the body 80' is provided with a bore having a relatively smaller upper section 130 and a relatively larger lower section 132. The section 130 corresponds to and is preferably dimensioned as described in connection with the bore 116 in Fig. 12. The lower bore portion 132 receives, preferably with a press fit, a flow controlling insert 134, which has a plurality of grooves 136 milled or otherwise provided in the surface thereof, and which grooves, with the adjacent wall portions of the bore 132, define a plurality of coolant passages. The lower end of the insert 134 projects outwardly of the end of the body 80' by an amount sufficient to define the neck over which the tip 94' is fitted. The lower ends of the just-mentioned coolant passages are, consequently, defined by the grooves 136 and by the adjacent wall portions of the pocket in the tip 94'.

The tip 94' may and preferably does correspond to the tip 94, both as to material and methods of forming, with the exception that the ribs 100' and the central column 96' terminate below the upper surface 140 of the rim of the tip by an amount slightly in excess of the distance to which the insert 134 projects beyond the end of the body. In this instance, also, the top of the column 96' is shown as being flat, instead of pointed, and as being substantially flush with the upper surfaces of the ribs 100'. In this instance, the bonding material, preferably solder as before, is applied between the surface 140 and the opposed end surface of the body 80', and between the inner surface of the pocket 92' and the engaged peripheral surfaces of the ribs 142, which define the grooves 136.

As before, the insert 134 is provided with a central bore 144, which snugly but freely receives the deflector tube 37. As will be obvious, the deflector tube may be projected to a desired distance into the insert, the exact distance being immaterial.

It will be understood that in each of the several embodiments, it is usually preferred to have the combined areas of the outflow passages somewhat in excess of the area of the inflow passage or passages. This is for the reason that since the surface area of the outflow passages is greater than that of the inflow passage, some greater frictional resistance to flow is encountered and, by preserving the above relation between the inflow and outflow areas, undesirable increases in back pressure in the coolant lines may be avoided.

Although only several specific embodiments of the invention have been described in detail, it will be appreciated that various further modifications in the form, number and arrangement of parts may be made without departing from the invention.

What is claimed is:

1. An electrode having a body provided with a work engaging face, and provided with means adapting it for removable connection to a supporting member having inflow and outflow coolant passages, said body having means defining separate inflow and outflow passages communicating respectively with said first-mentioned passages and through which coolant may be circulated between the supporting member and the body, said body passage defining means being immovable relative to each other, being in communication with each other in the region of said face, and being concentrically arranged.

2. An electrode having a body provided with a work engaging face, and provided with means adapting it for removable connection to a supporting member having inflow and outflow coolant passages, said body having means defining separate inflow and outflow passages communicating respectively with said first-mentioned passages and through which coolant may be circulated between the supporting member and the body, said body passages being concentrically arranged, and the outer said passage being constituted by a plurality of at least substantially separate passages, said body passages communicating with each other in the region of said face.

3. An electrode comprising a body provided with a longitudinally extending bore, a tubular plug fitted in said bore, said plug having longitudinally extending grooves in its outer surface which, with the wall of the body bore, define coolant passages, and a work engaging tip having a cavity through which the plug bore and the said passages communicate with each other.

4. A heating element for conducting electric current which is passed through work to heat the same, said element being adapted to be secured to a supporting body, said element having a work engaging face and having a cavity through which a coolant may circulate, one wall of said cavity being opposite said face, said wall having fin means projecting therefrom into said cavity to increase the heat transfer area of said cavity.

5. A heating element for conducting electric current which is passed through work to heat the same, said element being adapted to be secured to a supporting body, said element having a work engaging face and having a cavity through which a coolant may circulate, one wall of said cavity being opposite said face, said wall having fin means projecting therefrom into said cavity to increase the heat transfer area of said cavity, said fin means extending in such a direction in said cavity, and said cavity being so shaped, as to promote a streamlined flow of said coolant through said cavity.

6. A heating element for conducting electric current which is passed through work to heat the same, said element being adapted to be secured to a supporting body, said element being shaped to define a generally cup-shaped cavity through which a coolant may circulate, the outer surfaces of the base of the cavity constituting a work engaging surface, the inner surface of said base having fin means projecting therefrom to increase the effective heat transfer area of the inside surface of the cavity.

7. A heating element for conducting electric current which is passed through work to heat the same, said element being adapted to be secured to a supporting body, said element being shaped to define a generally cup-shaped cavity through which a coolant may circulate, the outer surfaces of the base of the cavity constituting a work engaging surface, the inner surface of said base having fin means projecting therefrom to increase the effective heat transfer area of the inside surface of the cavity, said fin means extending in a direction to promote a streamlined flow of said coolant.

8. A heating element for conducting electric current which is passed through work to heat the same, said element being adapted to be secured to a supporting body, said element being shaped to define a generally cup-shaped cavity through which a coolant may circulate, the outer surfaces of the base of the cavity constituting a work engaging surface, the inner surface of said base having fin means projecting therefrom to increase the effective heat transfer area of the inside surface of the cavity, said fin means extending generally radially outwardly from the axial center of said cavity.

9. A heating element for conducting electric current which is passed through work to heat the same, said element comprising a body and a work engaging tip on the body, said body having means defining inflow and outflow passages for coolant, said tip having a work engaging face and having a cavity which communicates with said passages and through which said coolant may circulate, one wall of said cavity being opposite said face, said wall having fin means projecting therefrom into said cavity to increase the heat transfer area of said cavity.

10. A heating element for conducting electric current which is passed through work to heat the same, said element comprising a body and a work engaging tip on the body, said body having means defining inflow and outflow passages for coolant, said tip having a work engaging face and having a cavity which communicates with said passages and through which coolant may circulate, one wall of said cavity being opposite said face, said wall having fin means projecting therefrom into said cavity to increase the heat transfer area of said cavity, said fin means extending in such a direction in said cavity, and said cavity being so shaped, as to promote a streamlined flow of said coolant through said cavity.

11. The structure of claim 9, wherein the said passages are concentric and the said fin means extend generally radially from the axial center of the cavity.

12. The structure of claim 9, wherein the said tip is formed of hardened conductive material and is removably secured to the body for ready replacement.

13. A heating element for conducting electric current which passes through work and thereby heats the work, said element having a body and a work engaging tip, the body portion being adapted for releasable connection to a holder having means which define separate inflow and outflow coolant passages, the body having inner and outer means defining separate and concentrically arranged inflow and outflow passages which communicate respectively with the aforesaid passages when the body is connected to the holder and said tip portion having a cavity through which the body passages communicate with each other.

14. The structure of claim 13 wherein the said outer body passage defining means define a plurality of circumferentially distributed passages.

FRED H. JOHNSON.

REFERENCES CITED

The following references are of record in the file of this patent:

UNITED STATES PATENTS

| Number | Name | Date |
| --- | --- | --- |
| Re. 13,530 | Warren (1) | Feb. 11, 1913 |
| 1,058,677 | Taylor | Apr. 8, 1913 |
| 1,256,951 | Thomson | Feb. 19, 1918 |
| 1,784,384 | Paugh | Dec. 9, 1930 |
| 1,792,688 | Graff | Feb. 17, 1931 |
| 2,138,388 | Platz | Nov. 29, 1938 |
| 2,250,645 | Meadowcroft et al. | July 29, 1941 |
| 2,271,119 | Cox et al. | Jan. 27, 1942 |
| 2,293,523 | Warren (2) | Aug. 18, 1942 |
| 2,315,854 | Holt | Apr. 6, 1943 |

FOREIGN PATENTS

| Number | Country | Date |
| --- | --- | --- |
| 15,555 | Great Britain | Sept. 24, 1898 |